United States Patent [19]

Hayford, Jr.

[11] Patent Number: 4,648,603
[45] Date of Patent: Mar. 10, 1987

[54] VIDEO GAME CONTROL CONSOLE

[76] Inventor: Robert L. Hayford, Jr., 2528 Orion, League City, Tex. 77573

[21] Appl. No.: 736,277

[22] Filed: May 20, 1985

Related U.S. Application Data

[63] Continuation-in-part of Ser. No. 550,372, Nov. 11, 1983, Pat. No. 4,518,164.

[51] Int. Cl.[4] .......................................... A63B 71/00
[52] U.S. Cl. ................... 273/148 B; 108/43; 224/222
[58] Field of Search ...................... 273/148 B; 108/43; 224/222

[56]         References Cited
U.S. PATENT DOCUMENTS

| | | | |
|---|---|---|---|
| 2,338,816 | 9/1943 | Lockhart | 108/43 |
| 2,750,705 | 6/1954 | Keveney | 108/43 |
| 3,407,757 | 8/1967 | Warner | 108/43 |
| 4,484,743 | 11/1984 | Williams | 273/148 B |
| 4,518,164 | 5/1985 | Hayford, Jr. | 273/148 B |

Primary Examiner—Richard C. Pinkham
Assistant Examiner—Gary Jackson
Attorney, Agent, or Firm—Pravel, Gambrell, Hewitt & Kimball

[57]           ABSTRACT

A game control support tray with left and right sides which can be strapped across both legs in the lap of the user for holding video game control components for a video game player. The control support tray has one or more tray surfaces connected by a support structure for holding video game control components which can be adjusted to preselected positions between the left and right sides for increased comfort of the operator and more effective use of the game control.

8 Claims, 7 Drawing Figures

VIDEO GAME CONTROL CONSOLE

REFERENCE TO RELATED APPLICATION

This is a continuation-in-part of U.S. Ser. No. 550,372 filed Nov. 11, 1983, entitled "Video Game Control Console," which issues on May 21, 1985, as U.S. Pat. No. 4,518,164.

BACKGROUND OF THE INVENTION

1. Field of the Invention

The present invention relates to the control mechanisms for use with home video game computers. The present invention more particularly relates to an adjustable video game control console which can be sized to sit on the lap of the player, so that the player's upper leg area support multiple containers carrying various controller components.

2. General Background

Video game computers in use have various control mechanisms, one of which is a directional movement control stick, commonly known as a "joy stick". The circumference of the joy stick is somewhat larger than the circumference of a pencil or pen. The lower end of the joy stock is attached to a base container of hard plastic or metal which fits comfortably into the palm of the hand of adult players. A trigger button which controls various game functions can be located at the top of the joy stick. The joy stick and trigger button can be linked to the video game computer by a flexible wire. Players command the game action on a video screen by pressing the trigger button and/or by rotating the joy stick. Typical commands transmitted by pressing the trigger button include e.g., the firing of bullets and missiles; the jumping of human or animal figures; and, resetting the game. These functions are activated on video games in commercial establishments by rapidly pressing a large button that can be separate and spaced from the directional movement control or "joy stick".

The "joy stick" directs the movement of a game object, typically a tank, space ship, animal or human figure, on the video screen. The joy stick is rotable on its base over a range of 360°, and directs the movement of the game object on the screen in any direction within a like range. For example, moving the joy stick forward or away from the player may cause the game object to move up the screen while moving the joy stick backwards or toward the player may move the object down screen. Movement of the joy stick to the right or left moves the game object to the right or left. In commercial establishments, the video game directional movement controls are typically activated by large buttons or moving levers having a bulbous protrusion at one end for the player to grasp.

At least one video game has a keyboard as part of the game control mechanism. The keyboard, like the base of the joy stick is compact enough to fit into the palm of the hand of an adult player. The keyboard allows the player to enter additional information into the video computer while game is in play. The keyboard allows the player to select views from the windows of the space ship, to align targets between the cross hairs on the scopes of firing mechanisms and the like. Keyboards may be used e.g. to select the video game to be played, the experience level of the player and/or the number of persons playing the video game. Joy sticks, controller buttons and such video game control mechanisms are known per se, and are manufactured and sold nationally.

Home video game control mechanisms are usually much smaller than their commerical counterparts. These smaller units are awkward to use. Unlike the video games found in commercial establishments such as video arcades, shopping malls, restaurants, grocery stores and lounges, home video game controls are not set in the video game computer console. The home video game controls are either held in the hand or placed on a level surface such as a table or desk top. During play, these smaller home video control mechanisms can slip, slide or tilt in the hand or on the table surface. The slipping, sliding and tilting of the control mechanism interferes with the player giving timely and accurate commands to the computer. Fatigue sets in after long time periods of play as the player is required to fully support the controller with a hand and manipulate the joystick, button or keyboard with the other hand. Blisters can develop where the hand continuously squeezes the controller in the same place. These problems have plagued the art and have blistered the hands of many a video competitor-young and old.

There are several lap supported tray type devices which have been patented.

U.S. Pat. No. 2,663,603 issued to I. Newman shows a lap tray that can be attached to users lap by a clamping mechanism. The tray allows the user to balance items such as foods and beverages conveniently on his lap.

U.S. Pat. No. 2,844,429 issued to E. Frey illustrates a lap try having a rectangular top, a pair of support plates which are slidably mounted on tracks under the tray top. The support plates are hingedly affixed to panels, which when in use abut the outer sides of the user's legs.

U.S. Pat. No. 2,750,705 issued to L. P. Keveney discloses a lap board fishhook extracting device, having a flat top surface and a pair of side retainers that abut against the outer sides of the user's legs.

GENERAL DISCUSSION OF THE PRESENT INVENTION

The preferred embodiment of the apparatus of the present invention provides a video game control console for use with home video game computers. It is a device comprising first and second preferably rectangular video game control containers. The video game control containers are connected together by a frame having horizontal cross members. The video game control containers are slidable upon the frame cross members to adjust the distance between the containers to fit the size of the lap of the individual player. Each video game containers can be desirably centered on each leg of the player. The upper legs of the player then support each container, leaving the player's hands free to manipulate the controls. The positions of the control containers may be interchangeable on the frame in relation to one another, to accommodate the manual dexterity of left or right-handed players.

The controller containers are made of light weight structural material such as plastic or metal so that it can be comfortably supported upon the laps of even very young players. Cushioning in the form of slip-resistant material such as foam rubber can be affixed to the bottom surface of the video game control containers to increase the comfort of players and to prevent the video game console from easily slipping from the player's lap or table-top.

Leg straps carried by each container may be clasped together by using buckles, Velcro, and the like. The leg straps can further stabilize the video game console on the player's lap and prevent the video game control mechanisms, such as the joy stick or directional movement grip, the keyboard, trigger button and/or command button from slipping, sliding or tilting during use. Since the two controller containers are supported by and affixed to the player's legs, the problem of blisters is eliminated, at least with regard to blisters generated by hand support of the individual controller container. The player can sit in a chair or on the floor with knees bent or crossed. With the present invention, the containers are merely adjusted to fit the upper leg position of the player, whatever sitting position the player selects. The same apparatus can be used by all family members including small children and large adults.

A first video game control container has a directional movement grip that performs the same function as the joy stick of conventional video game control mechanisms. However, with the present invention, its size can be substantially increased to a size much larger than the typical "pen-size" joy stick presently seen on the market. A larger directional movement grip can be provided with the present ivnention which is easier to grasp and direct than the smaller joy sticks currently available. A larger joy stick or a larger button or the like can be used because the present invention uses multiple, spaced apart controller containers which can be adjusted into multiple positions with respect to each other.

The directional movement grip can have a trigger button on its front surface slightly below the top of the grip. The trigger button may be pushed by either player's thumb or forefinger. The trigger button, like the trigger button on the conventional joy stick, transmits commands to the video computer regarding the firing of bullets or missiles; the leaping movement of human or animal figures; or resetting the game. The base of the directional movement grip can be recessed below the top surface of first video game control console and is made of flexible structural material which allows the directional movement grip to be rotated in a range of 360°.

A second video game control container has on its top surface a command button, that can be of a substantially larger diameter than trigger buttons on the joy stick or on directional movement grip. The command button serves the same function as the trigger button however. The command button is linked by a flexible wire to the trigger button and can be used as an alternative game control mechanism. The larger command button can be pounded, slapped or hit by players who have difficulty repeatedly pushing the trigger button. Use of the larger button tends to increase the game skills of players since the game objects appearing on the video screen perform their firing and leaping functions with greater rapidity thereby creating higher game scores.

Second video game control container may have a keyboard which protrudes through the top surface of the container. The function of the keyboard is that of conventional electronic control keyboards, e.g., allowing the players to input information into the video computer while the game is being played. Some keyboards have holders into which game button identification cards may be inserted over the keyboard. Greater stability of operation is achieved by mounting the keyboard to the second video game control container.

The object of this invention is thus to provide a new and improved adjustable, lap supported video game control mechanism which provides greater stability and fit during use.

A further object of the invention is to provide an enlarged video game control apparatus that is adjustably fitted to each player's lap, and which simulates the large control console of expensive commercial video game models.

A further object of the present invention is to provide a video game control apparatus which can be secured by the player's legs during use, relieving pressure points on the user's hands and thereby preventing blisters.

A further object of the present invention is to provide a video game control apparatus that can accommodate enlarged directional movement grips, enlarged buttons, keyboards and like controllers that may be easily grasped or actuated by the players.

BRIEF DESCRIPTION OF THE DRAWINGS

A better understanding of the invention can be had when the detailed description of a preferred embodiment set forth below is considered in conjunction with the drawings, in which.

DETAILED DESCRIPTION OF THE PREFERRED EMBODIMENT

Figure 1:
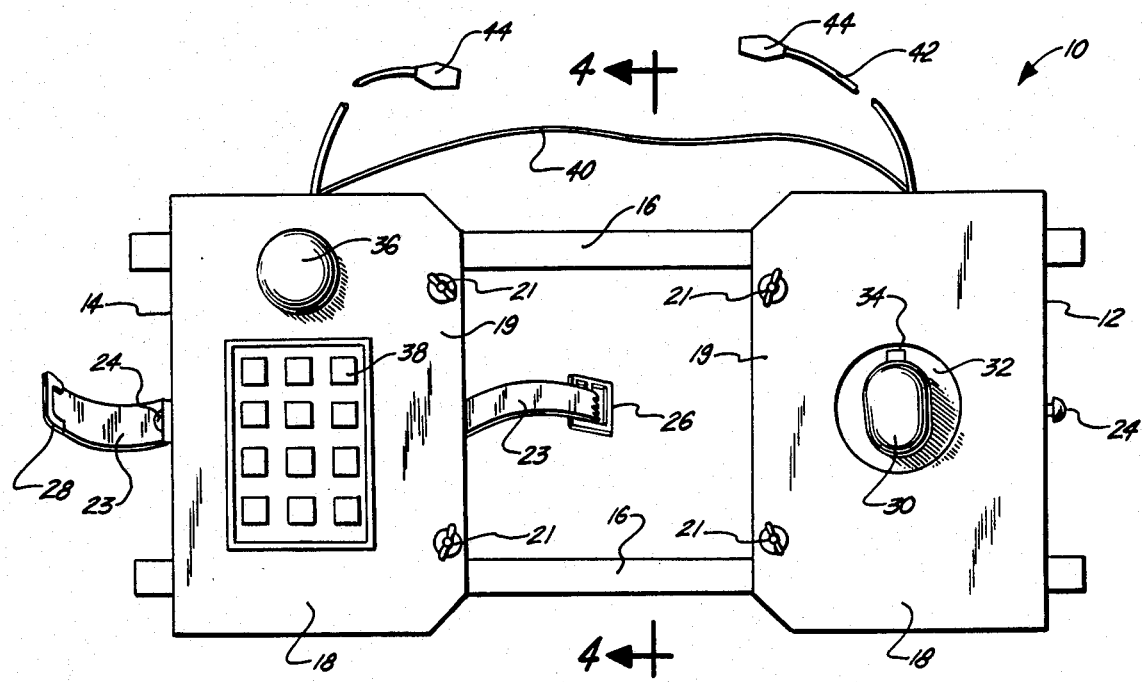
FIG. 1 is a top perspective view of the preferred embodiment of the apparatus of the present invention.
Figure 2:
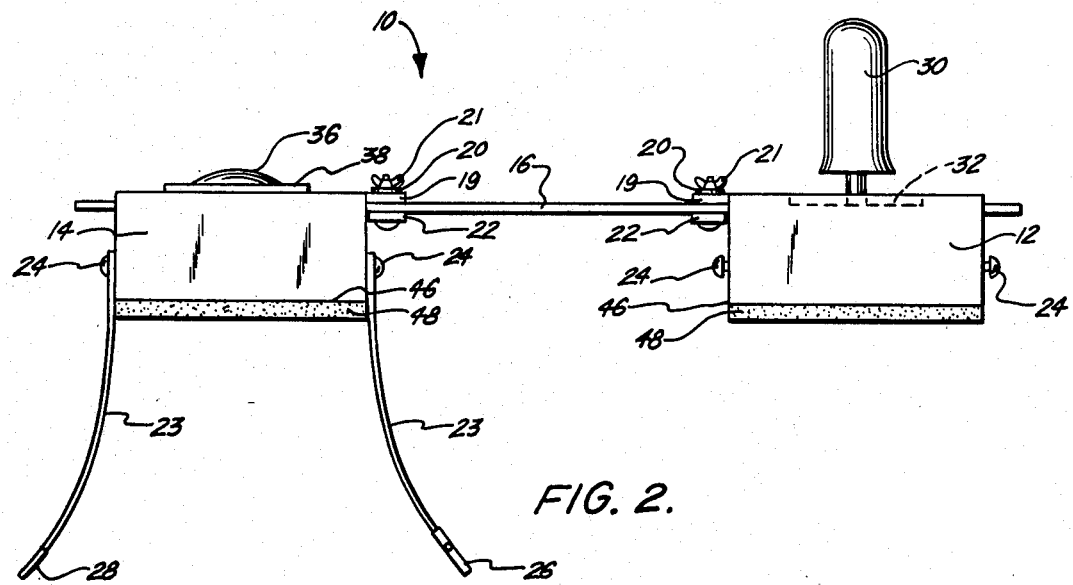
FIG. 2 is a sectional, rear view of the preferred embodiment of the apparatus of the present invention.
Figure 3:
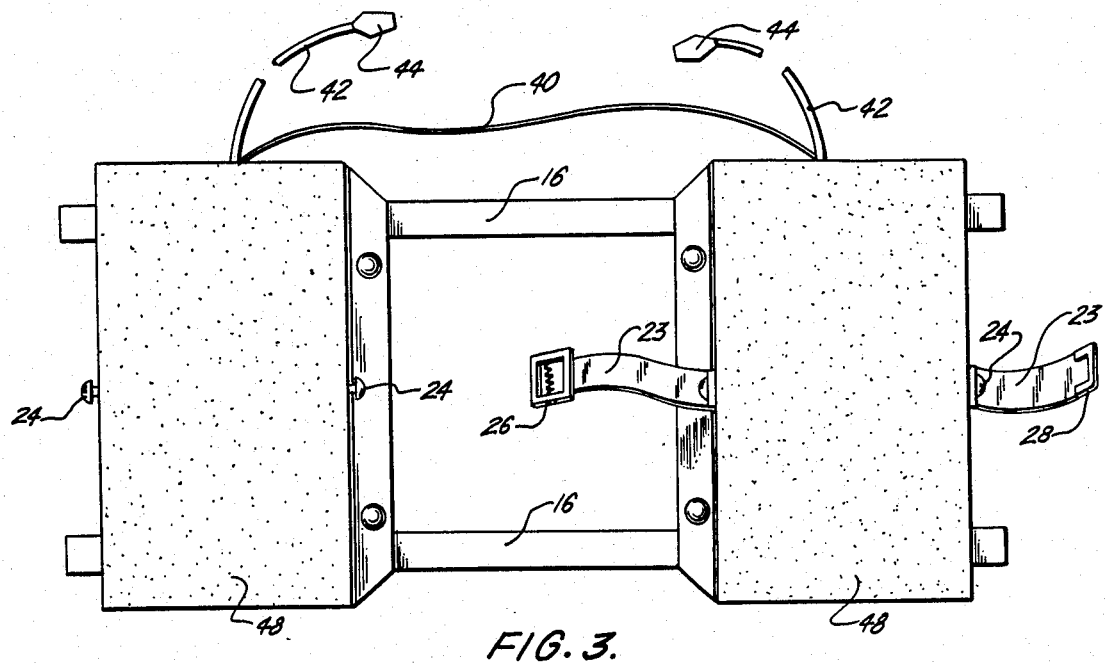
FIG. 3 is a bottom, perspective view of the preferred embodiment of the apparatus of the present invention.
Figure 4:
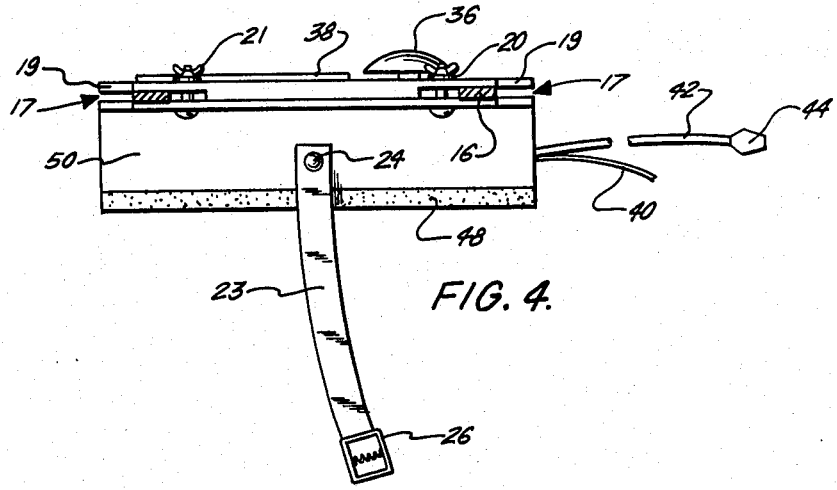
FIG. 4 is a side, sectional view of the preferred embodiment of the apparatus of the present invention taken along lines 4—4 of FIG. 1.

FIGS. 1, 2 and 3 illustrate best the preferred embodiment of the apparatus of the present invention, generally designated by the numeral 10. Video game console 10 comprises a first video control container 12 and a second video control container 14 which are connected together by and slidable upon a frame defined by horizontal parallel cross members 16. Each container 12, 14 is preferably box-shaped, having upper and lower surfaces 18, 48. The upper top surface 18 features laterally extending lip 19 (FIGS. 2 and 4) which is spaced above its respective container 12, 14 defining a slot 17 which is receptive of cross members 16. When the clamp 20 and fastener 21 connection is tightened, lip 19 is drawn closer to clamp panel 22, thus reducing the thickness of slot 17. Clamp 20 and fasteners 21 also bias clamp panel 22 toward lip 19 and so that compression can be applied to cross members 16 (See FIG. 2). Tightening or loosening of clamps 20 and fasteners 21 allow video game console 10 to be adjusted to fit the size of the lap of the player. (See FIGS. 1, 2, 3 and 4). The two control containers 12, 14 can thus be adjustably positioned with respect to each other and then clamped into a desired position. A plurality of eg. four (4) clamps 20 and fasteners 21 are shown. Each clamp 20 and fastener 21 is positioned adjacent the sliding connection of cross member 16 to a container 12, 14. In operation, the player adjusts the distance between each container 12, 14 so that a container 12, 14 is centered upon and supported by one of the player's legs respectively.

Leg attachments 23, are in the form of dual, connectable leg straps 23. Straps 23 are attached to video game control containers 12, 14 by means of a fastner 24 such as a snap, bolt or the like. Leg attachments 23 can be secured to the legs of the player by closure 26 such as a buckle. Tongue cover 28 of leg attachment 23 allows easy insertion of the opposing leg attachment means into closure 26. (See FIG. 1, 2, 3, and 4).

Various controller components can be placed on the amply spaced container upper surfaces 18. As an example, directional movement grip 30 is flexibly attached to first video game control container 12 at base 32. Directional movement grip 30 has trigger 34 which serves variable functions depending upon the video game being played. (See FIGS. 1 and 5).

A command button 36 is shown on second video game control container 14. Button 36 may serve the same function as trigger 34, but its larger size facilitates the play of games involving rapid, repeated motions such as the firing of missiles. (See FIGS. 1, 2, and 4).

A keyboard 38 of second video game control container 14 could provide for the input of desired information into a video game computer (Not shown) during play.

Flexible wire cable connectors 40 can link containers 12, 14 and any contained electrical components.

Flexible wire connectors 42 also link video game control console 10 and a video game computer (Not shown). Plugs 44 on flexible wire connector means 42 provide the direct connection with the video game computer (Not shown). (See FIGS. 1, 3, 4, and 5).

The bottom 46 of video game control containers 12, 14 are in the preferred embodiment composed of a rigid material to which is affixed a cushioning, non-slip material 48 which both protects the player's legs or table top during use and retards the slipping of console 10 from the player's lap during use (see FIGS. 2–5). Surface 46 material 48 could be foam, rubber, neoprene or the like.

Figure 5:
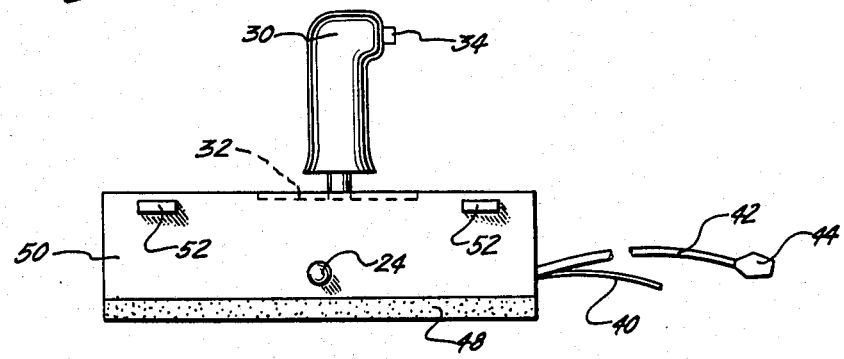
FIG. 5 is another sectional, side view of the preferred embodiment of the apparatus of the present invention showing the first control contaner, control grip, command trigger and wire cable connectable to a video game computer.

Sides 50 of first video game control container 12 and second video game control container 14 provide slots 52 through which cross member 16 is inserted (see FIG. 5).

Figure 6:
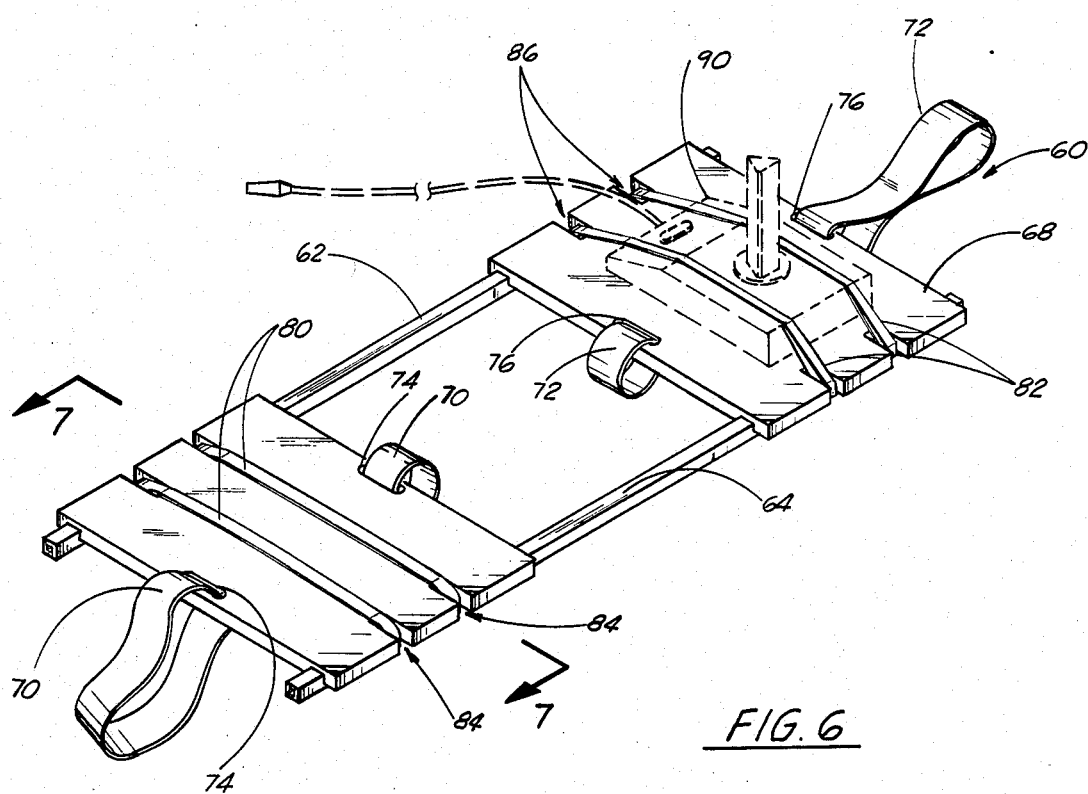
FIG. 6 is a top, perspective view of an alternate embodiment of the apparatus of the present invention.
Figure 7:
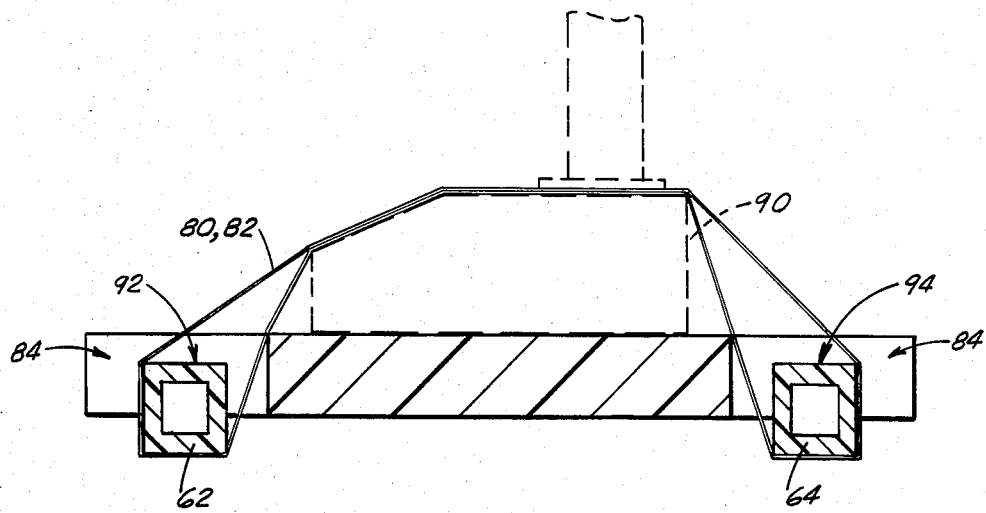
FIG. 7 is a sectional view of an alternate embodiment of the apparatus of the present invention taken along lines 7—7 of FIG. 6.

FIGS. 6 and 7 illustrate an alternate embodiment of the apparatus of the present invention designated generally by the numeral 60. The embodiment of FIG. 6 includes an adjustable frame having two spaced, generally parallel crossbars 62, 64 upon which slide preferably two component trays 66, 68, each of which is adjustable with respect to and slidable upon crossbars 62, 64. Each tray 66, 68 includes a strap 70, 72, each of which is mounted through slots 74, 76 respectively that are formed on opposite sides of each tray 66, 68. The slots 74, 76 are formed on the edge portions of each tray 66, 68 and preferably those edge portions which are generally perpendicular to crossbars 62, 64. In this manner, the straps 72, 74 could be attached respectively to the legs of a user.

Alternately, a single component tray could be used having variable points of attachment along the length thereof so that a video game component could be placed at lateral positions from side to side and secured upon the surface of such a tray at the points of attachment. However, with regard to the preferred embodiment, the individual component trays 66, 68 are movable and each tray has an upper, generally flat surface that can carry a video game component as more fully described hereinafter. Buckles 78, 80 can be used respectively upon straps 70, 72 as shown in the drawings.

Each component tray 66, 68 carries multiple spaced flexible bands (e.g., rubberbands 80, 82) for securing a video game control components 90 such as the joy stick shown in the drawing. In the preferred embodiment, two spaced apart generally parallel rubberbands are provided on each component tray 66, 68. In FIG. 6, a pair of spaced apart, generally parallel rubberbands 80 are affixed to component tray 66 and a pair of rubberbands 82 are affixed to component tray 68. Each component tray 66, 68 provides a pair of recessed notches 84, 86 which cooperate with crossbar 62, 64 to form an attachment for rubberbands 80, 82. During assembly, each tray 66, 68 is slided upon crossbars 62, 64. Elongated slots defining tracks (FIG. 7) are provided in each component tray 66, 68 to accomodate crossbars 62, 64. Each rubberband 80, 82 thus encircles crossbar 62 at one end portion and crossbar 64 at its other end portion. The particular component tray 64, 68 can then be moved by simply sliding upon the crossbars as the rubberbands will normally slide with the particular component tray when it is moved. Manual adjustment of the rubberbands 80, 82 can be used to facilitate a smooth movement of each tray 66, 68 upon the crossbars 62, 64 to achieve a desired adjusted distance between trays 66, 68. In FIG. 7, the elongated track provided through each tray 66, 68 is designated as 92, 94 in the drawings.

A video game component 90 is shown upon component tray 68 in FIG. 6 as being held in position by means of rubberbands 82. The component tray 66 in FIG. 6 is not holding a video game component but is rather exposed for purposes of illustration. It should be understood that a single tray having multiple rubberbands 80, 82 and multiple notches 84, 86 could be used so that one or more video game component controls 90 could be moved to the left and right laterally upon the surface of such a component tray by merely changing the position of the component 90. Thus, a single component tray 66 might have multiple pairs of notches 84 (as shown in FIGS. 6–7), each having a rubberband 80 traversing the pair of notches as shown in FIG. 7. Such a tray could have, for example, two, four, six, eight or ten pairs of opposing notches of the type and construction as shown with respect to FIGS. 6 and 7. Thus, any adjacent pair of rubberbands 80, 82 could be used to secure a game component 90 laterally at any position upon the tray surface.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A game control support tray for holding video game control components for a video game player, comprising:

a. a support frame having a left and right side, and defining a structure that can be held in the lap across both legs of a player; and b. one or more control component holding tray surfaces having means for carrying one or more control components that can be adjustably mounted upon the tray so that the lateral position of the component upon the tray surface can be varied from the left to right side of the support frame, so that the relative position of the component can be adjusted to a position preselected by an individual game player.

2. A game control support tray for holding video game control components for a video game player, comprising:

a. a support frame defining a structure that can be held in the lap of a player; and b. one or more control component holding tray surfaces which are on separate, spaced apart component tray members movable with respect to each other upon the support frame, the control component holding tray surfaces having means for carrying one or more control components that can be adjustably mounted upon the tray surface so that the lateral position of the component upon the tray surface can be adjusted to a position preselected by an individual game player.

3. The game control console of claim 2, wherein the tray surfaces are rectangular.

4. The game control console of claim 2, having lap attachment means carried by at least one control component holding tray surface for securing at least one control component tray surface to the legs of the player during use.

5. The game control console of claim 2, wherein the carrying means includes opposed slots on opposite edges of the tray surfaces and band members traversing the tray surface between the slots.

6. The game control console of claim 2, wherein the carrying means includes multiple, generally parallel sets of flexible bands on the surface.

7. The game control console of claim 2, further comprising strap means for attaching the frame to the legs of the player during use.

8. The game control console of claim 2, further comprising means for securing each surface to the frame at a desired position on the frame.

* * * * *